United States Patent
Jones et al.

(10) Patent No.: US 6,470,669 B2
(45) Date of Patent: Oct. 29, 2002

(54) HYBRID INJECTION THRUST VECTOR CONTROL

(75) Inventors: Herbert Stephens Jones, Lacombe; Joseph Paul Arves, New Orleans; Darren Andrew Kearney, Slidell; Ryan Earl Roberts, Meraux, all of LA (US); Rory Nell McLeod, Lynden, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/035,263

(22) Filed: Jan. 3, 2002

(65) Prior Publication Data

US 2002/0078680 A1 Jun. 27, 2002

Related U.S. Application Data

(62) Division of application No. 09/577,797, filed on May 24, 2000, now Pat. No. 6,354,074.

(51) Int. Cl.[7] .................................................. F02K 1/28
(52) U.S. Cl. .......................................... 60/231; 60/251
(58) Field of Search .................................. 60/231, 251

(56) References Cited

U.S. PATENT DOCUMENTS 3,300,978 A * 1/1967 Pennington ................... 60/231

* cited by examiner

Primary Examiner—Ehud Gartenberg
(74) Attorney, Agent, or Firm—Duane Morris LLP

(57) ABSTRACT

A rocket engine (10) generates a flow of hot propulsion fluid through a nozzle (14N) for generating propulsive thrust along a thrust vector 8. Hybrid exhaust gas generators (36,38) have their exhausts (44,54) through the side of the nozzle. Each gas generator includes a fuel grain (46,56) and a source of oxidizer (16,40,50). The fuel grain is kept hot by either or both (a) direct radiation or conduction from the hot propulsion fluid, or (b) by a trickle of oxidizer. The fuel grain can thus react quickly to a substantial flow of oxidizer.

7 Claims, 3 Drawing Sheets

HYBRID INJECTION THRUST VECTOR CONTROL

This application is a division of Ser. No. 09/577,797 filed May 24, 2000 now U.S. Pat. No. 6,354,074.

FIELD OF THE INVENTION

This invention relates to control of pitch and yaw of vehicles propelled by high-velocity gas jets, as for example rockets.

BACKGROUND OF THE INVENTION

Rocket and other jet-type propulsion systems are widely used for vehicle propulsion, notably for lifting payloads into orbit, for destructive military missiles, and for military aircraft. In general, such systems or engines produce thrust by discharge of a plume or exhaust at high velocity along the axis of a nozzle. The problems of pitch and yaw directional control of such vehicles are widely known, and have been solved in a number of ways. External fins and canards have been used for directional control. These fins may be fixed for the most general directional control, or they may include articulable flaps which are controlled in response to a controller for feedback flight control. When the vehicle equipped with fins or canards must itself be carried on an aircraft before launch, or mounted in a canister, the fins andor canards may be arranged in a stowed configuration, and deployed in conjunction with the initial stages of launch. Such fins and canards depend upon aerodynamic forces, so are only usable within the atmosphere, which may be taken to extend to an altitude of 100,000 feet. Within the atmosphere, the use of fins or canards increases the drag of the vehicle equipped therewith.

Another form of attitude or directional control of a vehicle equipped with rocket-type propulsion is that of thrust vector control (TVC), described U.S. Pat. No. 2,943,821, issued Jul. 5, 1960 in the name of Wetherbee, Jr.; U.S. Pat. No. 3,166,897, issued Aug. 21, 1961 in the name of Lawrence et al; in U.S. Pat. No. 3,132,476, issued May 12, 1964 in the name of Conrad; and U.S. Pat. No. 3,132,478, issued May 12, 1964 in the name of Thielman, and in the text "Rocket Propulsion Elements" by Robert Sutton. Sutton categorizes TVC mechanisms into four basic categories:

(a) Mechanical deflection of a nozzle or thrust chamber;
(b) insertion or adjustment of vanes located in the jet exhaust stream;
(c) injection of fluid into the diverging nozzle section to deflect the exhaust flow; and
(d) separate thrust-producing devices which are independent of the main flow through the nozzle, providing two thrust vectors which may be summed to obtain the net thrust vector.

It should be noted that this last may not be a form of TVC, since it does not act on the thrust vector itself, but merely adds a separate thrust vector.

Mechanical deflection of a nozzle or thrust chamber requires a highly reliable movable structure which is subject to the entire thrust load, which may be costly and undesirably massive. Insertion or adjustment of vanes within the exhaust stream requires vanes which are structurally sound at the very high temperatures and pressures of the exhaust stream. Thrust-producing devices independent of the main nozzle have been used, especially for end-of-flight corrections of destructive missiles acting against maneuvering targets; they must, however, be located within the body of the vehicle if additional aerodynamic drag is to be avoided.

According to Sutton, "the injection of secondary fluid through the wall of the nozzle into the main gas stream has the effect of forming oblique shocks in the nozzle diverging section, thus causing a deflection of part of a main gas flow," and this deflection of the main gas flow, in turn, results in a deviation of the thrust vector from the axis of the nozzle.

Liquid injection thrust vector control is described in U.S. Pat. No. 3,737,103, issued Jun. 5, 1973 in the name of Howell et al. Liquid injection thrust vector control is a proven technology, which is used in applications such as Titan III and Minuteman. In liquid injection thrust vector control, liquid is stored in either the propellant tanks or auxiliary tanks of the vehicle. The liquid is controllably distributed or manifolded to various injection positions around the periphery of the nozzle. When a pitch or yaw correction is desired, a signal is sent to a valve or valves controlling the injection of liquid into the exhaust plume at locations associated with the plane(s) of the correction thrust. Injection of the liquid into the exhaust stream results in vaporization of the liquid, and also results in a change in thrust along the relevant plane. Liquid injection has known problems, which include the instability of stored liquids, as described in U.S. Pat. No. 3,092,963, issued Jun. 11, 1963 in the name of Lawrence. Also, the axial thrust of the vehicle is reduced by the energy required to vaporize the injected liquid, and to bring it up to the temperature of the surrounding gas. The amount of liquid which is required to produce a given change in attitude is generally determined by experimentation.

FIG. 1 is a chart illustrating the amount of side injectant which is required to produce a side force, according to Sutton. In FIG. 1, the ordinate- or y-axis represents the ratio of the side force divided by (or normalized to) axial force, and the abscissa- or x-axis represents the ratio of injectant mass flow divided by primary mass flow. As illustrated in FIG. 1, injection of inert liquids results in the least side thrust or directional control for a given mass flow, while reactive fluids provide greater control. The greatest control is provided by a flow of propellant hot gas. Such charts can be obtained experimentally by maintaining a constant main exhaust flow rate through the nozzle, while varying the side injection flow rate.

As suggested by FIG. 1, greater side force or thrust control can be achieved by injection of reactive liquids than of inert liquids. U.S. Pat. No. 2,952,123, issued Sep. 3, 1960 in the name of Rich, describes injection of fuel into a jet nozzle, which burns in the supersonic exhaust stream to provide directional control. Similarly, FIG. 1 indicates that injection of propellant hot gas provides yet greater side force or directional control as a function of mass flow.

As an example of the use of the chart of FIG. 1, consider a rocket engine or motor which generates an axial thrust of 10,000 pounds force (lbf) at an exhaust flow rate of 33 pounds of mass (lbm). If a 2° deflection of the thrust vector is required, then (10,000) (sin 2°) of lateral force, corresponding to 349 lbf of normal side force, is required. The side-to-axial-force ratio is calculated as 0.035, which corresponds to a side injection flow rate of (0.035×33)=1.98 lbm/s for inert liquids, 1.32 lbm/s for reactive liquids, or 1.0 lbm/s for propellant hot gas.

From FIG. 1, it is apparent that injection of hot gas is the most effective way, in terms of relative mass flow, to achieve side force or directional control. One advantageous way to provide hot gas for side injection is to tap the gas from the main combustion chamber, because the chamber pressure is greater than the static pressure in the nozzle as a result of expansion, and a substantial side injection flow rate can therefore be achieved. U.S. Pat. No. 3,759,039, issued Sep. 18, 1973 in the name of Williams, describes the bleeding of hot gases from the combustion chamber of a rocket, by way of controllable valves, into the side of the nozzle. In such an arrangement, the valves must control the flow of very hot gases, which may adversely affect their reliability, and may result in a costly structure using exotic materials and sacrificial elements or coatings.

The problem of control of the flow of very hot propellant-type gases makes the use of cooled or cold gas advantageous. The chamber temperatures of liquid- and solid-propellant rockets may approach 6000° F., which is too high for conventional piping and valves. Cool-gas or cooled-gas injection is described in U.S. Pat. No. 3,255,971, issued Jun. 14, 1966 in the name of Widell; U.S. Pat. No. 3,698,642, issued Oct. 17, 1972, in the name of McCullough; U.S. Pat. No. 4,384,694 in the name of Watanabe et al.; U.S. Pat. No. 4,424,670, issued Jan. 10, 1984 in the name of Calabro; and in the abovementioned Lawrence patent. The hot gas flowing through the valves in the cool- or cooled-gas injection arrangements should be at a temperature no greater than about 1100° F. In liquid-propellant rocket engines, attempts have been made to draw the hot gases from the fuel-rich boundary layer at the chamber wall, which is often at a lower temperature than the average chamber temperature. In solid-propellant rockets, less aggressive propellants, containing fewer oxidizing ingredients, can be used, but at the expense of reducing already-limited performance.

Improved thrust vector control is desired.

SUMMARY OF THE INVENTION

A vehicle according to an aspect of the invention comprises a source, such as a rocket engine chamber, of main propulsion fluid, and a nozzle coupled to the source of propulsion fluid, for generating propulsion thrust by discharge of the main propulsion fluid generally along a discharge axis. A hybrid fluid generator includes a solid "propellant" or fuel grain, which can be combusted in the presence of oxidizer. The hybrid exhaust fluid generator includes an exit port coupled to a side of the nozzle at a first location, and also including an oxidizer input port. The hybrid exhaust fluid generator generates secondary fluid at the exit port in response to reaction of the grain with oxidizer applied to the oxidizer input port, and injects the secondary fluid into the side of the nozzle, for thereby deflecting the main propulsion thrust relative to the axis. In this arrangement, the amount of the deflection is controlled by control of the rate of flow of the oxidizer to the oxidizer input port of the hybrid exhaust fluid generator.

Another version of a vehicle according to the invention comprises a further or second hybrid exhaust fluid generator. The further hybrid exhaust fluid generator is similar to the first, in that it includes a solid grain and an exit port coupled to the side of the nozzle. In the case of the second hybrid exhaust fluid generator, the exit port is coupled to the nozzle at a position spaced about, and in one embodiment diametrically opposite, relative to the axis, to the first location. The second hybrid exhaust fluid generator also including an oxidizer input port, and is for generating further secondary fluid at the exit port of the further hybrid exhaust fluid generator in response to reaction of the oxidizer with the grain, and for injecting the further secondary fluid into the side of the nozzle at the diametrically opposite location, for thereby deflecting the main propulsion thrust, relative to the axis, in a direction opposed to that of the first-mentioned hybrid exhaust fluid generator. A particular manifestation includes control arrangement coupled to the oxidizer input ports of the first-mentioned and further hybrid exhaust fluid generators, for, when thrust deviation is desired within a plane including the axis and the first-mentioned hybrid exhaust fluid generator, providing one of the first-mentioned and further hybrid exhaust fluid generators with oxidizer. Those skilled in the art know that this provides thrust deflection in the plane of the two exit ports, depending upon control of the secondary fluid flow rates. In a preferred embodiment, the control arrangement couples the oxidizer to the one of the first-mentioned and further hybrid exhaust fluid generators to the exclusion of the other one of the first-mentioned and further hybrid exhaust fluid generators.

In another hypostasis of the invention, the vehicle includes a source of fluid oxidizer, and the control arrangement includes a controllable valve arrangement coupled between the source of fluid oxidizer and the oxidizer input ports of the first-mentioned and further hybrid exhaust fluid generators.

A method for directive control of a vehicle according to another aspect of the invention includes the step of generating high-temperature propulsion fluid, and directing the propulsion fluid through a nozzle to thereby generate thrust along a thrust axis. A fuel grain of a hybrid exhaust gas generator is kept hot by at least one of (a) heating by the high-temperature propulsion fluid, or (b) by a flow of a trickle of oxidizer which combusts with the fuel grain. The fuel grain is thus in a hot state, ready for substantially instantaneous combustion with a flow, or substantial flow greater than the trickle, of oxidizer. When thrust vector modification is desired, substantial oxidizer is supplied to the grain, which combusts, to generate exhaust gas. The exhaust gas is injected or allowed to enter the nozzle in an asymmetrical manner, where it disrupts the flow of the propulsion fluid in a manner which affects the thrust vector.

DESCRIPTION OF THE INVENTION

The invention is predicated on the understanding that high performance levels require that the side-injected gas must be at a temperature substantially higher than that at which valves can be reliable. This consideration proscribes use of uncooled "tap-off" arrangements, since piping and valves are required. Hot-gas generators are not ordinarily used because of the difficulty of throttling them, and of disposing of the un-needed hot gas. U.S. Pat. No. 4,686,824, issued Aug. 18, 1987 in the name of Dunaway et al. describes a hot-gas generator in the form of a plurality of solid-fuel generators spaced 180° apart around the axis of the main convergent/divergent nozzle. The hot-gas generators, when ignited, produce the desired hot gas for injection. In order to vary or control the amount of hot gas injected by each hot-gas generator and to thereby control the thrust direction of the main nozzle, controllable vortex-type valves are used to individually throttle the individual hot-gas generators.

Figure 1:
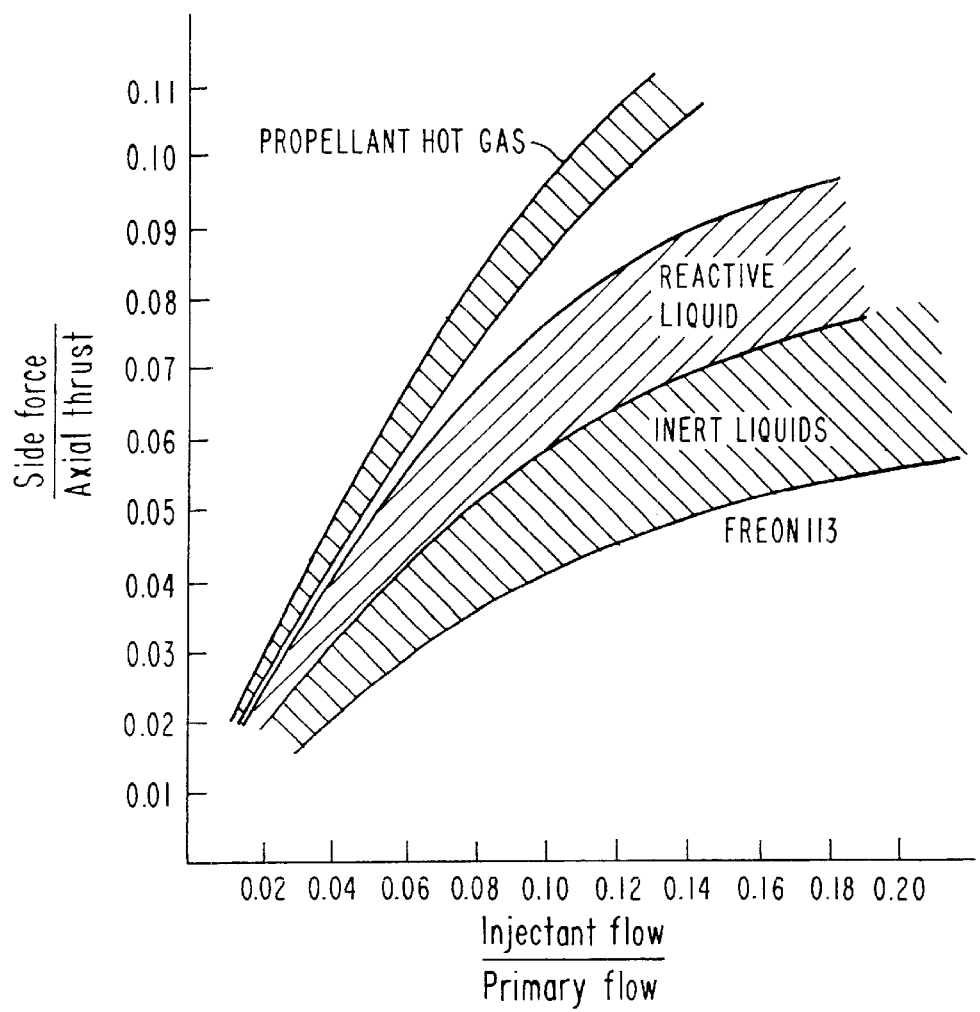
FIG. 1 is a chart showing the relationship between injected nozzle mass flow normalized to nozzle main mass flow and relative side force.
Figure 2:
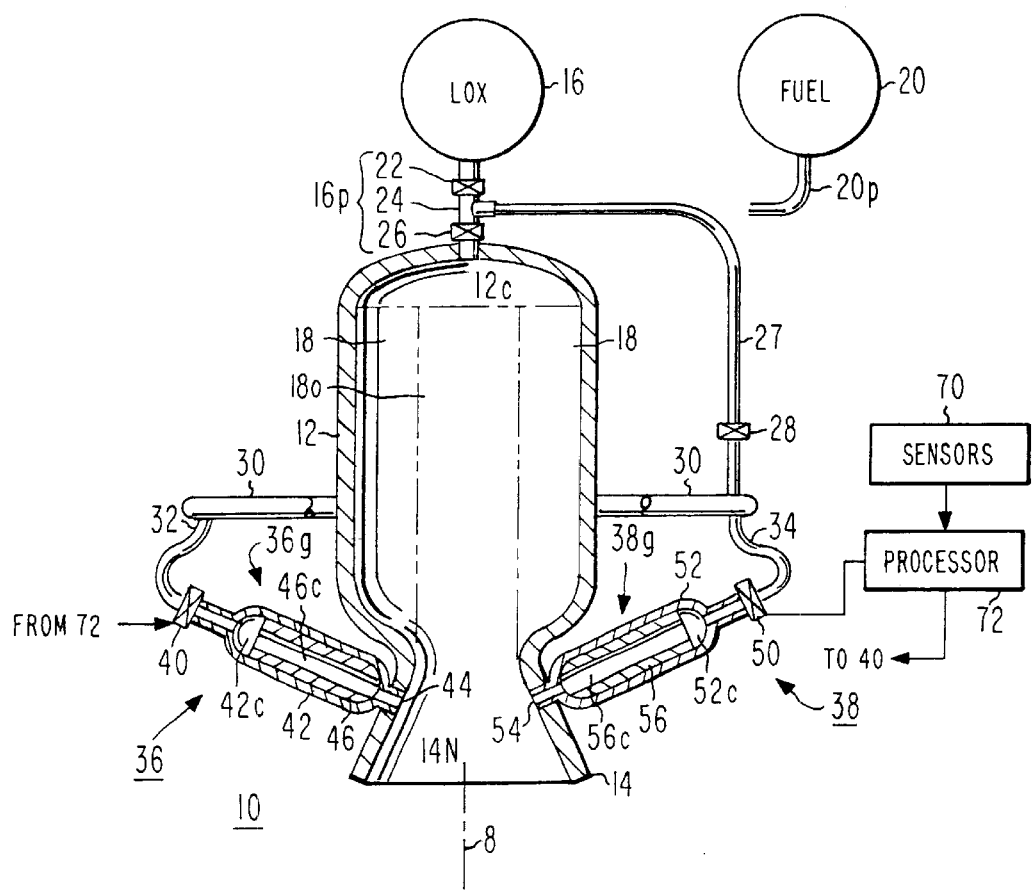
FIG. 2 is a simplified representation of a thruster system according to an aspect of the invention.

FIG. 2 illustrates a thruster according to one embodiment of the invention. In FIG. 2, a rocket engine 10 includes a combustion chamber housing 12 enclosing a combustion chamber 12c. Combustion chamber 12c opens into a converging/diverging nozzle 14N defined by a nozzle housing 14. A pressure tank 16 is illustrated as being mounted above combustion chamber housing 12, in line with chamber and nozzle axis 8. Pressure tank 16 is filled with pressurized oxidizer fluid, such as liquid oxygen (LOX). Of course, the oxidizer must be selected to properly combust the fuel portion of the propellant. The fuel portion of the propellant may be provided by a solid grain, illustrated in phantom as 18, having an axial opening 18o. as described, for example, in U.S. Pat. No. 5,765,361, issued Jun. 16, 1998 in the name of Jones et al., or from tank 20 of liquid fuel, coupled to the combustion chamber by controlled propellant flow paths designated 20p, depending upon whether the main rocket engine 10 is a hybrid-fuel rocket, a solid-fuel rocket, or a liquid-propellant rocket. As known, the solid grain 18 may have more than one axial opening such as 18o, as is well known in the art.

Oxidizer tank 16 is connected to the upper end of combustion chamber housing 12 by way of a path 16p for the flow of oxidizer. Path 16p includes a first controllable valve 22, which is opened to allow oxidizer to leave tank 16 and to arrive at a tee junction 24. Path 16p also includes a further controllable valve 26 which controls the flow of oxidizer from tee junction 24 into the upper end of combustion chamber 12c. Once introduced into the interior of combustion chamber 12c, the oxidizer combusts with or oxidizes the fuel, however introduced, and creates high pressure hot gas within the combustion chamber.

When valve 22 of oxidizer flow path 16p is open, oxidizer can flow by way of tee junction 24, by way of an oxidizer flow path including a pipe 27 and a further valve 28 to a manifold or plenum 30, which carries the oxidizer around the chamber housing 12, so that, when valve 28 is opened, the oxidizer is available to be tapped off at various locations around the engine 10. Two of the possible locations tap locations are illustrated as 32 and 34. When valves 22 and 28 are open, oxidizer is available at tap 32 for supplying a controllable hot-gas generator 36, and oxidizer is also available at tap 34 for supplying a controllable hybrid exhaust fluid generator or hot-gas generator 38.

Hot-gas generators 36 and 38 are at diametrically opposed locations relative to nozzle axis 8, so that side force or thrust can be obtained in two separate directions. Controllable hot-gas generator 36 includes a gas flow control valve 40, which controls the flow of oxidizer to the "upper" end of a gas generator 36g. Gas generator 36g includes a combustion chamber housing 42 defining a combustion chamber 42c, which opens at its "lower" end through an aperture 44 into the side of nozzle 14N. Combustion chamber 42c of hot-gas generator 36g contains a solid-fuel grain 46 defining a central channel 46c extending toward aperture 44. Similarly, controllable hot-gas generator 38 includes a gas flow control valve 50, which controls the flow of oxidizer to the "upper" end of a gas generator 38g. Gas generator 38g includes a combustion chamber housing 52 defining a combustion chamber 52c, which opens at its "lower" end through an aperture 54 into the side of nozzle 14N. Combustion chamber 52c of hot-gas generator 38g contains a solid-fuel grain 56 defining a central channel 56c extending toward aperture 54. Those skilled in the art will recognize controllable hot-gas generators 36 and 38 as being equivalent to a hybrid solid-fuel/liquid-oxidizer rocket, with what would normally be the exhaust of the hybrid rocket opening into side injection apertures 44 and 54, respectively.

According to a further aspect of the invention, the location of the fuel grain 46 and 56 in the hot-gas generators 36 and 36 is close enough to the corresponding injection aperture 44 and 54, respectively, so that the hot gases existing at the nozzle 14N as a result of operation of the main rocket engine provide enough heat or radiation through the side injection apertures to maintain the fuel grains hot enough to combust. This heating is accomplished principally by plume radiation. Combustion does not take place, however, in the absence of excess oxidizer. Since operation of the main rocket engine is presumably for maximum propulsive efficiency, there is little or no excess oxidizer available to the fuel grains 46 or 56. The main rocket engine exhaust is at a low pressure downstream of the converging portion of the nozzle, undergoing expansion to a high-velocity condition. When a control valve 40 or 50 (or both) are opened to allow oxidizer to flow into the upper ends of the hot gas generators 36g or 38g, respectively, the combustion begins immediately, with less delay (or no delay) attributable to cooling of the grain by the oxidizer. Experimental results indicate that ignition of the hybrid gas generator can occur in milliseconds under such conditions.

Figure 3:
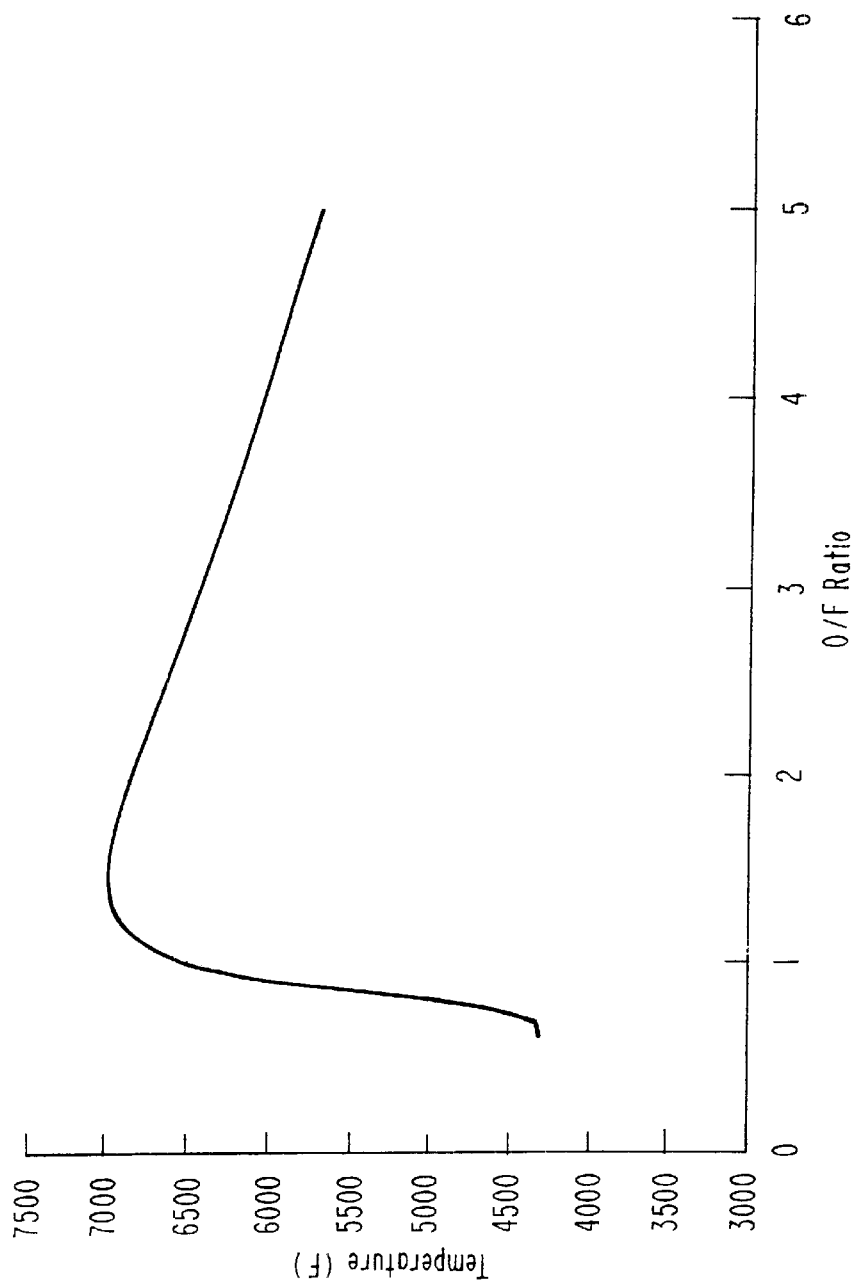
FIG. 3 is a chart illustrating hot-gas temperature versus oxidizer-to-fuel ratio.

The arrangement of the invention provides hot gas side injection which is controlled by valve(s) which handle only oxidizer, which valves are well known and readily available. FIG. 3 is a plot of exhaust temperature versus oxidizer/fuel (O/F) mixture ratio for a hybrid rocket, where the fuel is hydroxyl terminated polybutadiene (HTPB) and the oxidizer is oxygen. It can be seen that the highest temperature is in excess of 6500° F. Such high temperatures enhance the side-force-to-axial-force ratio, thereby requiring a lower injected mass to achieve a given thrust deviation. The hot-gas generator housings 42 and 52 are protected from direct exposure to the high combustion temperatures within chambers 42c and 52c by the presence of the noncombusted portion of the fuel grains 46 and 56, respectively. The only region which must be exposed to the high combustion temperatures is the aperture itself. Consequently, the region of the aperture is constructed from high-temperature-capable materials similar to those of the nozzle throat and nozzle liner.

For applications in which the injected grain cannot be maintained ready for combustion by the plume radiation, a steady trickle of oxidizer can be allowed to enter the chambers of the hot-gas generators, to maintain them in an "idle" state. So long as the hybrids are physically mounted in diametrically-opposed pairs about the axis 8, the idling state results in little or no net thrust deviation. Initial start-up of the hybrid hot-gas generators may use injection of hypergolic fluid into the "upper" ends of the generators, as well known in the art.

In FIG. 2, a vehicle attitude sensing arrangement is illustrated as a block 70. Sensing block 70 is coupled to a processor 72, which processes the sensed attitude, and compares it with a desired attitude to produce valve control signals. The valve control signals are coupled to the various valves associated with the hot-gas generators to provide the side thrust to correct the attitude.

Other embodiments of the invention will be apparent to those skilled in the art. For example, those skilled in the art know that the simple valve arrangement illustrated in conjunction with FIG. 2 may not provide the redundant flow paths which are advantageous for best reliability, but will know how to modify the arrangement to best advantage. While only two diametrically-opposed hot-gas generators are described in conjunction with FIG. 2, those skilled in the art will realize that this arrangement provides side forces in only one plane, namely the plane in which both side injection apertures and axis 8 lie. Further, while two additional hot-gas generators operating in a plane orthogonal to the plane of the first will, with proper control, provide complete pitch and yaw control, it is also possible to obtain coarse control by the use of only three total hot-gas generators, spaced 120° around the nozzle. A plurality of diametrically-opposed hybrid exhaust exit ports arranged around the periphery of the nozzle can be used to provide fine control of the thrust vector, and a combination of adjacent pairs allows even finer resolution and thrust vector control.

Thus, a vehicle (10) according to an aspect of the invention comprises a source, such as a rocket engine chamber (12c), of main propulsion fluid or plume. This source may be use liquid propellants, solid propellants, or hybrid propellants. The vehicle (10) also includes a nozzle (14) coupled to the source of propulsion fluid, for generating propulsion thrust by discharge of the main propulsion fluid generally along a discharge axis (8). A hybrid exhaust fluid generator (36) includes a solid "propellant" grain (46), which can be combusted in the presence of oxidizer. The hybrid exhaust fluid generator (36) includes an exit port (44) coupled to a side of the nozzle (14) at a first location, and also includes an oxidizer input port (44). The hybrid exhaust fluid generator (36) generates secondary fluid at the exit port (44) in response to reaction of the grain (46) with oxidizer applied to the oxidizer input port (44) of the hybrid exhaust fluid generator (36), and injects the secondary fluid into, or through, the side of the nozzle (14), for thereby deflecting the main propulsion plume or thrust relative to the axis (8). In this arrangement, the amount of the deflection is controlled by flow of the oxidizer to the oxidizer input port (44) of the hybrid exhaust fluid generator (36). The exit port of the hybrid exhaust fluid generator (36) allows heat from the propulsion fluid in the nozzle to maintain the hybrid fuel grain at a temperature sufficiently high to allow rapid combustion when the hybrid fuel grain is supplied with oxidizer.

Another version of a vehicle (10) according to the invention comprises a further or second hybrid exhaust fluid generator (38). The further hybrid exhaust fluid generator (38) is similar to the first-mentioned above, in that it includes a solid grain (56) and an exit port (54) coupled to the side of the nozzle (14). In the case of the second hybrid exhaust fluid generator (38), the exit port (54) is coupled to the nozzle (14) at a position angularly spaced, relative to the axis, to the first location. In one embodiment, the angular spacing is 180°. The second hybrid exhaust fluid generator (38) also includes an oxidizer input port (54), and is for generating further secondary fluid at the exit port (54) of the further hybrid exhaust fluid generator (38) in response to reaction of the oxidizer with the grain (56), and for injecting the further secondary fluid into the side of the nozzle (14) at the angularly spaced or diametrically opposite location, for thereby deflecting the main propulsion thrust, relative to the axis, in a direction at least partially opposed to that of the first-mentioned hybrid exhaust fluid generator (36). A particular manifestation includes a control arrangement (40, 50, 70, 72) coupled to the oxidizer input ports (44, 54) of the first-mentioned and further hybrid exhaust fluid generators, for, when thrust deviation is desired within a plane including the axis and the first-mentioned hybrid exhaust fluid generator (36), providing one of the first-mentioned (36) and further (38) hybrid exhaust fluid generators (36, 38) with oxidizer. Those skilled in the art know that this provides thrust deflection in the plane of the two exit ports (44, 54), depending upon control of the secondary fluid flow rates. In a preferred embodiment, the control arrangement couples the oxidizer to the one of the first-mentioned and further hybrid exhaust fluid generators (36, 38) to the exclusion of the other one of the first-mentioned and further hybrid exhaust fluid generators (36, 38).

In another hypostasis of the invention, the vehicle (10) includes a source (16, 22, 24, 28) of fluid oxidizer, and the control arrangement (40, 50, 70, 72) includes a controllable valve arrangement coupled between the source of fluid oxidizer and the oxidizer input ports (44, 54) of the first-mentioned and further hybrid exhaust fluid generators (36, 38).

A method for directive control of a vehicle according to another aspect of the invention includes the step of generating high-temperature propulsion fluid, and directing the propulsion fluid through a nozzle to thereby generate thrust along a thrust axis. A fuel grain of a hybrid exhaust gas generator is kept hot by at least one of (a) heating by the high-temperature propulsion fluid, or (b) by a flow of a trickle of oxidizer which combusts with the fuel grain. The fuel grain is thus in a hot state, ready for substantially instantaneous combustion with a flow, or substantial flow greater than the trickle, of oxidizer. When thrust vector modification is desired, substantial oxidizer is supplied to the grain, which combusts, to generate exhaust gas. The exhaust gas is injected or allowed to enter the nozzle in an asymmetrical manner, where it disrupts the flow of the propulsion fluid in a manner which affects the thrust vector. Of course, if the exhaust gas were to be injected symmetrically about the nozzle, it would add to the overall thrust, but would not affect the thrust vector.

What is claimed is:

1. A vehicle, comprising:
    a source of main propulsion fluid;
    a nozzle coupled to said source of propulsion fluid, for generating propulsion thrust by discharge of said main propulsion fluid generally along a discharge axis; and
    a hybrid exhaust fluid generator including a solid grain, said hybrid exhaust fluid generator including an exit port coupled to a side of said nozzle at a first location, and also including an oxidizer input port, for generating secondary fluid at said exit port in response to reaction of said grain with oxidizer applied to said oxidizer input port, and for injecting said secondary fluid into said side of said nozzle for thereby deflecting said main propulsion thrust relative to said wherein said main propulsion fluid is at a high temperature, and said exit port is coupled to side of said nozzle in a such a manner that heat from said main propulsion fluid heats said grain, whereby said grain tends to combust readily with said oxidizer.

2. A vehicle according to claim 1, wherein the amount of said deflection is controlled by control of the flow of said oxidizer to said oxidizer input port of said hybrid exhaust fluid generator.

3. A vehicle according to claim 1, further comprising a further hybrid exhaust fluid generator, said further hybrid exhaust fluid generator including a solid grain and an exit port coupled to said side of said nozzle at a position angularly spaced, relative to said axis, to said first location, and also including an oxidizer input port, said further hybrid exhaust fluid generator being for generating further secondary fluid at said exit port of said further hybrid exhaust fluid generator in response to reaction of said oxidizer, and for injecting said further secondary fluid into said side of said nozzle at said position angularly spaced, for thereby deflecting said main propulsion thrust, relative to said axis, in a direction opposed to that of said first-mentioned hybrid exhaust fluid generator.

4. A vehicle according to claim 3, wherein said position angularly spaced is angularly spaced by 180°, so that said first-mentioned hybrid exhaust fluid generator and said further hybrid exhaust fluid generator are diametrically opposed to each other.

5. A vehicle according to claim 3, further comprising control means coupled to said oxidizer input ports of said first-mentioned and further hybrid exhaust fluid generators, for, when thrust deviation is desired within a plane including said axis and said first-mentioned hybrid exhaust fluid generator, providing one of said first-mentioned and further hybrid exhaust fluid generators with oxidizer.

6. A vehicle according to claim 5, wherein said control means couples said oxidizer to said one of said first-mentioned and further hybrid exhaust fluid generators to the exclusion of the other one of said first-mentioned and further hybrid exhaust fluid generators.

7. A vehicle according to claim 5, further comprising:
 a source of fluid oxidizer; and wherein
 said control means comprises controllable valve means coupled between said source of fluid oxidizer and said oxidizer input ports of said first-mentioned and further hybrid exhaust fluid generators.

* * * * *